(12) United States Patent
Takahashi et al.

(10) Patent No.: US 8,338,547 B2
(45) Date of Patent: Dec. 25, 2012

(54) POLYMER ALLOY AND PRODUCTION METHOD THEREOF

(75) Inventors: Hiroshi Takahashi, Nagoya (JP); Sadayuki Kobayashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 180 days.

(21) Appl. No.: 12/680,436

(22) PCT Filed: Sep. 18, 2008

(86) PCT No.: PCT/JP2008/066817
§ 371 (c)(1),
(2), (4) Date: Mar. 26, 2010

(87) PCT Pub. No.: WO2009/041335
PCT Pub. Date: Apr. 2, 2009

(65) Prior Publication Data
US 2010/0216946 A1  Aug. 26, 2010

(30) Foreign Application Priority Data

Sep. 27, 2007 (JP) .................................. 2007-252509
Mar. 31, 2008 (JP) .................................. 2008-090101

(51) Int. Cl.
*C08G 75/14* (2006.01)
*C08L 81/04* (2006.01)
*B29K 67/00* (2006.01)
*B29K 101/12* (2006.01)
*B29K 81/00* (2006.01)

(52) U.S. Cl. ............ 525/535; 525/50; 525/68; 525/165; 525/166; 525/389; 525/390; 525/397; 525/142; 428/480; 528/390; 528/373; 528/378

(58) Field of Classification Search .................... 525/50, 525/68, 165, 166, 389, 390, 397, 535, 142; 528/390, 373, 378; 428/480; 522/104, 107, 522/109, 110, 111, 153, 182
See application file for complete search history.

(56) References Cited

U.S. PATENT DOCUMENTS

| | | | | |
|---|---|---|---|---|
| 5,093,155 A | * | 3/1992 | Miyazaki et al. | 427/177 |
| 5,286,809 A | * | 2/1994 | Heinz et al. | 525/420 |
| 5,397,608 A | * | 3/1995 | Soens | 428/34.5 |
| 5,488,084 A | * | 1/1996 | Kadoi et al. | 524/423 |
| 5,679,456 A | * | 10/1997 | Sakai et al. | 428/340 |
| 5,789,073 A | * | 8/1998 | Odagiri et al. | 428/297.4 |
| 5,869,599 A | * | 2/1999 | Hay et al. | 528/389 |
| 6,027,794 A | * | 2/2000 | Ozaki et al. | 428/297.7 |
| 6,455,143 B1 | * | 9/2002 | Ishibashi et al. | 428/294.1 |
| 6,949,288 B2 | * | 9/2005 | Hodge et al. | 428/370 |
| 7,235,612 B2 | * | 6/2007 | Kobayashi et al. | 525/439 |
| 7,385,013 B2 | * | 6/2008 | Kobayashi et al. | 525/439 |
| 7,462,672 B2 | * | 12/2008 | Kobayashi et al. | 525/437 |
| 7,750,111 B2 | * | 7/2010 | Horiuchi et al. | 528/388 |
| 7,956,126 B2 | * | 6/2011 | Tamai et al. | 525/67 |
| 7,960,464 B2 | * | 6/2011 | Kobayashi et al. | 524/425 |
| 2004/0210009 A1 | * | 10/2004 | Kobayashi et al. | 525/433 |
| 2004/0266957 A1 | * | 12/2004 | Kobayashi et al. | 525/437 |
| 2005/0256275 A1 | * | 11/2005 | Kobayashi et al. | 525/349 |
| 2007/0225450 A1 | * | 9/2007 | Kobayashi et al. | 525/418 |
| 2008/0176999 A1 | * | 7/2008 | Tamai et al. | 525/63 |
| 2008/0226857 A1 | * | 9/2008 | Kobayashi et al. | 428/35.7 |
| 2010/0068518 A1 | * | 3/2010 | Honma et al. | 428/401 |
| 2010/0137531 A1 | * | 6/2010 | Horiuchi | 525/537 |

FOREIGN PATENT DOCUMENTS

| | | | |
|---|---|---|---|
| JP | 1-115934 A | | 5/1989 |
| JP | 7-207034 A | | 8/1995 |
| JP | 8-504850 A | | 5/1996 |
| JP | 2003-113304 A | | 4/2003 |
| JP | 2003-113307 A | | 4/2003 |
| JP | 2003-286414 A | | 10/2003 |
| JP | 2008231249 A | * | 10/2008 |
| WO | WO-94/11441 A1 | | 5/1994 |

* cited by examiner

*Primary Examiner* — Sanza McClendon
(74) *Attorney, Agent, or Firm* — Birch, Stewart, Kolasch & Birch, LLP

(57) ABSTRACT

To provide a structure material having excellent mechanical characteristics and a functional material having excellent regularity, provided are a polymer alloy which is composed of at least two components of thermoplastic resins and of which the structure can be controlled finely and evenly dispersed and a production method of the polymer alloy. With respect to a polymer alloy composed of at least two or more components of thermoplastic resins, a precursor (A) of at least one thermoplastic resin among the thermoplastic resin components composing the polymer alloy is chemically reacted in the co-presence of the remaining thermoplastic resin component (B1) and/or a precursor (B2) of the thermoplastic resin component to induce spinodal decomposition, so that it is made possible to obtain a polymer alloy having excellent regularity and of which the structure is finely controllable and the structure is evenly dispersed.

5 Claims, No Drawings

POLYMER ALLOY AND PRODUCTION METHOD THEREOF

FIELD OF THE INVENTION

The present invention relates to a polymer alloy structure-controllable from nanometer order to micrometer order, which is advantageously usable as a structural material by utilizing excellent mechanical characteristics or as a functional material by utilizing excellent regularity.

BACKGROUND ART

In recent yeas, development of polymer materials has been drastic and in terms of applications, the polymer materials are used not only for daily necessaries but also range all industrial fields such as automobiles, aircrafts, electronic devices, medical devices, etc. The reason for that may be said that resins with various structures have been developed and have satisfied the needs flexibly. However, the specs required for the polymer materials become further higher and it becomes impossible for an already existing single resin to satisfy an aim. Therefore, development of innovative materials has actively been performed by employing a technique of combining resins having different physical properties and extracting the advantages of the respective resins to be raw materials and compensating for their disadvantages one another, so-called a polymer-alloying technique, to draw excellent characteristics as compared with those of a single resin.

No need to say that the physical properties of raw material resins cause significant effects, the characteristics of a polymer alloy are significantly changed in accordance with dispersion phases and uniformity of these resins and it is expected to improve dynamic characteristics such as toughness by controlling the dispersion phase size to be 1 μm or smaller and evenly (Patent Document 1). Known as a polymer alloy obtained by once causing phase dissolution of two or more kinds of resins in one-phase and thereafter carrying out phase separation are those obtained by nuclei production and growth and those obtained by spinodal decomposition. In polymer alloying by nuclei production and growth, a dispersion structure, which is an island structure, is formed from the beginning and the structure is grown, so that it becomes difficult to control the dispersion phase size to be 1 μm or smaller and even. On the other hand, in spinodal decomposition, when the temperature of the mixture system once subjected to even phase dissolution at a temperature in phase dissolution range is quickly changed to an unstable range, the system swiftly starts phase separation toward a coexistence composition. In that time, the concentration is made monochromic at a constant wavelength and it is made possible to form both-phase continuous structure in which both separated phases are continuously and regularly entwined each other in a structure cycle.

Production methods of a polymer alloy by spinodal decomposition can be broadly divided into those by spinodal decomposition in a partial phase dissolution system and those by induction of spinodal decomposition by melt-kneading in a non-phase dissolution system. The former has problems not only limitation in usable polymers but also difficulty of controlling the dispersion diameter sine the temperature alteration is small. On the other hand, the latter, which is a method of inducing spinodal decomposition by once causing phase dissolution in a shearing condition at the time of melt-kneading and again producing an unstable state in an un-shearing condition, has a problem that the shearing is difficult to be carried out evenly and thus the evenness of the dispersion phase is lowered and also a problem that molecular weights are lowered by shearing.

To deal with such problems, in a polymer alloy of thermosetting resins, there is a method of obtaining a finely and evenly structure-controlled polymer alloy by inducing spinodal decomposition by causing a crosslinking reaction of precursors of the constituent thermosetting resins (Patent Document 2). Since the spinodal curve is changed due to the crosslinking reaction and the unstable region is expanded, this method is capable of controlling the structure more finely as compared with a method by temperature change of a partial phase dissolution system in which the spinodal curve is not changed and since the shearing is no need in the melt-kneading, the method is a method capable of obtaining an even structure. However, because of a polymer alloy of thermosetting resins, it is difficult to employ a molding method such as injection molding and extrusion molding for the obtained polymer alloy.

Patent Document 1: Japanese Patent Application Laid-Open (JP-A) No. HEI3-20333
Patent Document 2: JP-A No. 2003-286414

DISCLOSURE OF THE INVENTION

Problems to be Solved by the Invention

An object of the present invention is to provide a polymer alloy of which the structure is finely controllable and further the structure is evenly dispersed and composed of at least two components of thermoplastic resins for providing a structural material having excellent mechanical characteristics and a functional material having excellent regularity as well as its production method.

Means for Solving the Problems

To accomplish the above-mentioned object, the present invention has the following configurations.

1. A polymer alloy comprising at least two or more components of thermoplastic resins having a both-phase continuous structure with a structure cycle of 0.001 to 1 μm or a dispersion structure with an interparticle distance of 0.001 to 1 μm, wherein, in small angle x-ray scattering measurement in the case where the structure cycle or the interparticle distance is 0.001 μm or more and less than 0.1 μm and in light scattering measurement in the case where the structure cycle or the interparticle distance is 0.1 μm or more and 1 μm or less, $0<(a)/(b)\leq 1.2$ is satisfied wherein (a) is a peak half width in the spectrum formed by plotting the scattering intensity to the wavenumber of scattered light and (b) is the maximum wavenumber of the peak.

2. The polymer alloy according to 1, which is obtained by inducing spinodal decomposition by causing a polymerization reaction after phase dissolution of a precursor (A) with a molecular weight of 1500 or less of at least one thermoplastic resin component among the thermoplastic resin components composing the polymer alloy with the remaining thermoplastic resin component (B1) and/or a precursor (B2) of the thermoplastic resin component.

3. The polymer alloy according to 2, wherein the precursor (A) is a precursor of at least one resin selected from polyesters, polyamides, and polyarylene sulfides.

4. The polymer alloy according to 2 or 3, wherein the thermoplastic resin component (B1) is at least one component selected from polyimide, polyether imides, polyesters, polyamides, polyarylene sulfides, polycarbonates, polyalkylene glycols, and celluloses.

5. The polymer alloy according to one of 2 to 4, wherein the precursor (B2) of the thermoplastic resin component is at least one precursor selected from polyesters, polyamides, polyarylene sulfides, polycarbonates, polystyrene, poly (methacrylic acid ester), poly(acrylic acid ester), and polyacrylonitriles.

6. A molded product obtained by molding the polymer alloy according to one of 1 to 5.

7. A production method of a polymer alloy composed of at least two or more components of thermoplastic resins, wherein spinodal decomposition is induced by causing polymerization reaction after phase dissolution of a precursor (A) with a molecular weight of 1500 or less of at least one thermoplastic resin component among the thermoplastic resin components composing the polymer alloy with the remaining thermoplastic resin component (B1) and/or a precursor (B2) of the thermoplastic resin component.

8. The production method of a polymer alloy according to 7, wherein after phase dissolution of the precursor (A) with at least one of the remaining thermoplastic resin component (B1) and/or a precursor (B2) of the thermoplastic resin component and polymerization reaction, phase separation is carried out.

9. The production method of a polymer alloy according to 7 or 8, wherein the precursor (A) is a monomer and/or an oligomer of a thermoplastic resin.

10. The production method of a polymer alloy according to one of 7 to 9, wherein the precursor (A) and/or the precursor (B2) of the thermoplastic resin component is a cyclic compound.

11. The production method of a polymer alloy according to 10, wherein the cyclic compound is at least one selected from cyclic oligoesters, cyclic oligoamides, cyclic oligarylene sulfides, lactones, and lactams.

12. The production method of a polymer alloy according to one of 7 to 11, wherein the molecular weight of the precursor (B2) of the thermoplastic resin component is a cyclic compound is 100 or higher and 10000 or lower.

13. A production method of a polymer alloy comprising radiation ray irradiation to the polymer alloy according to one of 1 to 5 or a molded product according to 6 or the polymer alloy obtained by the production method according to one of 7 to 12.

14. The production method of a polymer alloy according to 13, wherein after formation of the both-phase continuous structure with a structure cycle of 0.001 to 1 μm or a dispersion structure with an interparticle distance of 0.001 to 1 μm and successive structure fixation, the radiation ray irradiation is carried out.

15. The production method of a polymer alloy according to 13 or 14, wherein the radiation ray irradiation is carried out in the co-presence of a radiation crosslinking aid capable of forming a chemical bond with one of the resin components composing a resin composition by radiation ray irradiation.

Effects of the Invention

According to the present invention, with respect to a polymer alloy composed of at least two or more components of thermoplastic resins, a precursor (A) of at least one thermoplastic resin among the thermoplastic resin components composing the polymer alloy is chemically reacted in the co-presence of the remaining thermoplastic resin component (B1) and/or a precursor (B2) of the thermoplastic resin component to induce spinodal decomposition, so that it is made possible to obtain a polymer alloy having excellent regularity and of which the structure is finely controllable and the structure is evenly dispersed. Herein, in the case where (A) and (B) are a same resin, the polymer becomes merely a polymer of one component and therefore, (A) and (B) are required to be different type resins. Further, since the polymer alloy is composed of thermoplastic resins, it can be used preferably for injection molding and extrusion molding. On the other hand, since monomers and oligomers have low molecular weights, it is made possible to produce a polymer alloy of a combination of polymers which are not made compatible by shearing or temperature change at the time of melt-kneading the polymers. Particularly, in the case of a combination of a monomer and an oligomer, the compatibility is further improved due to their low molecular weights and it is made possible to obtain polymer alloys of much more combinations.

BEST MODES FOR CARRYING OUT THE INVENTION

A polymer alloy of the present invention composed of at least two or more components of thermoplastic resins has a both-phase continuous structure with a specified constant structure cycle or a dispersion structure with a specified constant interparticle distance.

A polymer alloy exhibits excellent characteristics as compared with a single resin by drawing respective advantages of resins to be raw materials and compensating disadvantages. In this case, what are important are the size and the evenness of the structure cycle of the both-phase continuous structure or the interparticle distance of the dispersion structure of the polymer alloy. If the size is too large, only the physical properties of the respective raw materials are exhibited and thus it becomes difficult to compensate the disadvantages. On the other hand, if the size is too small, the characteristics of raw material resins are lost, and therefore, it is not preferable. Consequently, the size of the structure cycle of the both-phase continuous structure or the interparticle distance of the dispersion structure is preferably 0.001 to 1.0 μm, more preferably 0.001 to 0.5 μm, and even more preferably 0.001 to 0.3 μm.

Further, to confirm these both-phase continuous structure and dispersion structure, it is important that existence of a regular cycle structure is confirmed. That is, for example, in addition of confirmation of formation of the both-phase continuous structure by optical microscopic observation or transmission electron microscopic observation, it is necessary to confirm that the scattering maximum in scattering measurement carried out using a small angle x-ray scattering apparatus or a light scattering apparatus. The existence of the scattering maximum in the scattering measurement proves the existence of a regular phase separation structure with a certain cycle and the cycle Λm corresponds to the structure cycle in the case of the both-phase continuous structure and to the interparticle distance in the case of the dispersion structure. Further, the value can be calculated according to the following formula from the wavelength λ and the scattering angle θm of the scattering maximum:

$$\Lambda m = (\lambda/2)/\sin(\theta m/2)$$

Further, if there are coarse parts partially in the structure even though the size of the structure cycle in the both-phase continuous structure or the interparticle distance in the dispersion structure is in the above-mentioned range, at the time of receiving an impact, for instance, breakage or the like proceeds from that point as a starting point and thus intrinsic characteristics of a polymer alloy cannot obtained in some cases. Accordingly, the evenness of the structure cycle in the both-phase continuous structure and the interparticle distance in the dispersion structure of a polymer alloy becomes important. This evenness can be evaluated by small angle x-ray scattering measurement in the case of a polymer alloy having the structure cycle or the interparticle distance of 0.001 µm or more and less than 0.1 µm and by light scattering measurement in the case of a polymer alloy having the structure cycle or the interparticle distance of 0.1 µm or more and 1 µm or less.

The small angle scattering and the light scattering differ from each other in the analyzable phase separation structure size, and therefore, it is required to use them properly separately in accordance with the phase separation structure size of a polymer alloy. In addition to the size of the structure cycle in the both-phase continuous structure and the interparticle distance in the dispersion structure, the small angle x-ray scattering measurement and light scattering measurement give information relevant to the distribution. Practically, corresponding to the peak position of the scattering maximum in the spectrum measured by these measurements; that is, the scattering angle θm corresponds to the structure cycle in the both-phase continuous structure and to the interparticle distance in the dispersion structure and the spreading type of the peak corresponds to the evenness of the structures. In the present invention, as an index of the evenness, the inventors focus attention on the half width of the scattering maximum peak of a spectrum formed by potting the scattering intensity to the wavenumber of the scattered light. However, since the half width of the peak tends to increase along with the increase of the wavenumber of the peak maximum, the value of (a)/(b) calculated from the half width of the peak (a) and the wavenumber of the peak maximum (b) is employed as the index of the structure evenness. To exhibit excellent physical characteristics such as mechanical characteristics, higher structure evenness is more preferable, and with respect to the above-mentioned value of (a)/(b), it is preferably 1.2 or lower, more preferably 1.1 or lower, and even more preferably 1.0 or lower. Further, since it is better that the structure of a polymer alloy is evener, the lower limit of (a)/(b) is not particularly limited.

In the light scattering measurement and small angle x-ray scattering measurement, a sample is required to be in a thin film state. Thin film formation is made possible by cutting specimens by a microtome or the like and heat press. In the case of a light scattering apparatus, a thin film-like sample can be obtain easily by sandwiching a polymer alloy with cover glass with a thickness of about 0.1 mm and carrying out heat press. In the case of small angle x-ray diffraction, it has to be carried out carefully because of x-ray absorption by the cover glass. In the case of heat press, if heating is beyond the necessity or the pressing time is too long, the structure is sometimes coarsened depending on samples and therefore, the pressing conditions have to be determined carefully. Further, in the case of crystalline resins, since the alloy structure may possibly be changed by crystallization, the structure has to be fixed by quickly quenching after heat press.

A sample prepared to be like a thin film, the center part is subjected to measurement. In the case where the sample is too big relatively to a sample holder size of a measurement apparatus, the center part is cut out from the sample and measured. The thickness of the sample is adjusted to be an optimum thickness by layering a plurality of samples so as to obtain signal intensity as intense as possible. The signal intensity is increased in proportion to the sample thickness; however, the absorption of measurement light is also increased exponentially to the sample thickness in accordance with the Lambert-Beer rule to lower the signal intensity correspondingly and thus the sample thickness has to be determined based on the balance between them.

Further, measurement of a polymer alloy of a combination of polymers with a narrow refractive index difference is difficult since the signal intensity is low. In such a case, it is also effective to carry out treatment with a dyeing reagent such as iodine, $RuO_4$, $OsO_4$, or the like. In the case of the polymer composition with an unequal ratio, the structure sizes such as the structure cycles and the interparticle distances of the respective polymer components sometimes differ and a plurality of peaks corresponding to the structure sizes of the respective polymer components are observed in some cases. At that time, the scattering intensity is plotted in relation to the common logarithm of the wavelength λ in the scattering body of the scattered light and the half width of the peak is calculated from an approximate quadratic curve of the respective peaks. In the case where a plurality of peaks exist as described, with respect to at least one peak among them, the above-mentioned value of (a)/(b) is preferably 1.2 or lower, more preferably 1.1 or lower, and even more preferably 1.0 or lower. The half width of the peak in the invention means the width of the peak measured at a midpoint (point C) of a line segment between (point A) and (point B) wherein (point A) is the apex of the peak and (point B) is a crossing point of a straight line drawn parallel to the longitudinal axis of the graph from the apex (point A) of the peak and the base line of the spectrum. In addition, the peak width here means the width on the straight line parallel to the base line and passing (point C). As a preferable method of obtaining a polymer alloy having such a structure is a method of inducing spinodal decomposition by causing chemical reaction of a precursor (A) of at least one thermoplastic resin component among thermoplastic resin components composing the polymer alloy in the co-presence of the remaining thermoplastic resin component (B1) and/or a precursor (B2) of the thermoplastic resin component. Hereinafter, the spinodal decomposition will be described briefly.

Generally, polymer alloys composed of two resin components have, for their compositions, a compatible system of phase dissolution in the whole region of practical uses from glass transition temperature to heat decomposition temperature; reversely, non-compatible system of non-phase dissolution in the whole region; and a partial compatible system in which phase dissolution is cause in a certain region and phase separation state is caused in another region and this partial phase dissolution system includes those which cause phase separation by spinodal decomposition and phase decomposition by nuclei production and growth based on the condition of the phase separation state.

The phase separation by spinodal decomposition means phase separation caused in an unstable state in the inner side of the spinodal curve of a phase diagram of a resin composition of two different components and temperature and on the other hand, the phase separation due to the nuclei production and growth means phase separation caused in a metastable state in the outer side of the spinodal curve of the phase diagram.

The spinodal curve is a curve in which $(\partial^2 \Delta Gmix/\partial \phi^2)$ calculated by partially differentiating twice the difference (ΔGmix) between the free energy in the case of phase dissolution and the free energy of two phases not in phase dissolution state in the case of mixing two different resin components in relation to the composition and the temperature with the concentration (φ) becomes 0 and in the inner side of the spinodal curve, it shows an unstable state with $\partial^2 \Delta Gmix/$ $\partial\phi^2<0$ and in the outer side, $\partial^2\Delta Gmix/\partial\phi^2>0$. Also, the binodal curve is a curve of the boundary between a region of the phase dissolution of the system and a region of the phase separation in relation to the composition and temperature.

According to a detailed theory, in the case where the temperature of a mixture system once made to be in even phase dissolution state at a temperature in a phase dissolution region is quickly changed to be in the unstable region, the system swiftly starts phase separation toward a coexistence composition. The concentration at that time is made monochromic at constant wavelength and it is made possible to form both-phase continuous structure in which both separated phases are continuously and regularly entwined each other in a structure cycle ($\Lambda m$). The process of increasing only the concentration difference of both phases while keeping the structure cycle constant after the both-phase continuous structure formation is called as an initial process of spinodal decomposition. Further, the structure cycle ($\Lambda m$) in the above-mentioned initial process of spinodal decomposition thermodynamically has the following formula.

$$\Lambda m \wedge |Ts-T|/Ts]^{-1/2}$$

(wherein Ts is a temperature on the spinodal curve). Herein, so-called both-phase continuous structure in the invention means a structure formed by forming both components of mixed resins form continuous phases and three-dimensionally entwisting the continuous phases each other. A schematic drawing of this both-phase continuous structure is described in, for example, "Polymer Alloys Basics and Applications (2nd edition) (Chap. 10.1) (Tokyo Kagaku Dojin, The Society of Polymer Science, Japan (1993)).

In spinodal decomposition, after such initial process and through a middle process in which the wavelength increase and concentration difference increase simultaneously occur and a later process in which wavelength increase is caused self-similarly after the concentration difference reaches the coexistence composition, decomposition proceeds until two phases are macroscopically separated and in the invention, the structure may be fixed in a stage that a desired structure cycle is achieved before the ultimate macroscopic two phase separation. Further, in the wavelength increasing process from the middle process to the later process, depending on the effect of the composition and surface tension, continuity of one of the phase is broken and the above-mentioned both-phase continuous structure may sometimes change into the dispersion structure. In this case, the structure may be fixed in the stage in which a desired interparticle distance is achieved.

Herein, the so-called dispersion structure in this invention means an island structure in which particles of one resin component as one main component are scattered in a matrix of the other resin component as the other main component. Herein, a case of phase dissolution in this invention means a state that resins are mixed evenly in molecular level and concretely, it means a case that phases of two different components of resins neither form a phase structure of 0.001 μm or larger and also a case of non-phase dissolution means a case of not being in phase dissolution state and that is, it means a case that phases of two different components of resins both mutually form phase structures of 0.001 μm or larger. Whether phase dissolution occurs or not can be judged, as described in, for example, Polymer Alloys and Blends, Leszek A Utracki, Hanser Publishers, Munich Vienna, N.Y., P 64, 1990, by an electron microscope, a differential scanning calorimeter, and other various methods.

As a method of obtaining a thermoplastic polymer alloy excellent in the evenness of the present invention, a thermoplastic polymer alloy can be obtained by inducing spinodal decomposition by causing a chemical reaction of a precursor (A) of a thermoplastic resin component in the co-presence of the remaining thermoplastic resin component (B1) and/or a precursor (B2) of the thermoplastic resin component, that is, by reaction-induction type phase decomposition. This method is characterized in that the shearing or pressure is lower as compared with that of melt-kneading, which is a conventional common polymer alloy production method. As a result, there are a characteristic that a risk of decreasing the molecular weight is low and a characteristic that a risk of decreasing the evenness of the phase separation structure attributed to the distribution of shearing force and pressure is low. Particularly, in the case where the chemical reaction is accompanied with molecular weight increase by polymerization or the like; that is, a case a raw material of a resin component composing a polymer alloy, which is an oligomer or a low molecular weight substance (a precursor of a resin component), is compatible with the remaining resin component and thus the above-mentioned monomer, oligomer, or low molecular weight substance is highly polymerized to give a resin to be alloyed and the obtained resin causes phase separation from the other resin component, since the structure cycle ($\Lambda m$) in the initial process of the spinodal decomposition becomes small, the structure cycle of the polymer alloy can be made more fine and therefore, it is preferable. On the other hand, in the case of polymer alloying by conventional melt-kneading, since phase dissolution of polymers is caused to alloy the polymers by compressing the free volumes between polymers by applying shearing or pressure to the polymers while melting the polymers, if shearing or pressure is distributed besides the molecular weight decrease due to the application of shearing and pressure, there is a risk of lowering the evenness of the interparticle distance in the structure cycle or the dispersion structure and therefore, it is not preferable. Further, in this case, along with the molecular weight change due to polymerization and crosslinking, the glass transition temperature and the crystal melting temperature in the case of a crystalline resin are changed and further the change from the phase dissolution to the phase decomposition due to the molecular weight change differs respectively for systems and therefore, it cannot be generalized, the temperature for the phase dissolution, heat treatment temperature for performing the initial process, heat treatment temperature for structure development from the initial process, and other conditions can be set based on phase diagrams of combinations of various molecular weights by performing simple preliminary experiments.

The alloying method of the invention is efficient to produce a polymer alloy having such an even structure and also has a character that alloying of combinations of polymers, which are conventionally regarded to be difficult for alloying, is made possible. Hereinafter, this point will be described.

To cause phase dissolution of different molecules, the mixing free energy change ($\Delta G^M$) is required to be minus. The mixing free energy can be calculated according to the following formula from mixing enthalpy change ($\Delta H^M$), mixing entropy change ($\Delta S^M$), and temperature (T):

$$\Delta G^M = \Delta H^M - T\Delta S^M.$$

Consequently, it is more advantageous that the mixing entropy change is higher to make the mixing free energy change be minus. The mixing free entropy is proportional to the reciprocal of the polymerization degree according to Flory-Huggins theory. That is, the mixing free entropy change differs no less than 1000 times between a polymer with polymerization degree of 1000 and a monomer.

Accordingly, in the alloying using a monomer or an oligomer in the present invention, the mixing entropy is high and consequently, it is significant that the mixing free energy change tends to be minus and it is advantageous in phase dissolution with a polymer. As a result, it is made possible to obtain a polymer alloy of a combination of polymers which cannot cause phase dissolution each other by applying shearing or temperature change at the time of melt-kneading the polymers. Particularly, in the case of a monomer and an oligomer, since they have low molecular weights and have further improved compatibility and thus it is made possible to obtain polymer alloys of much more combinations.

Combinations of thermoplastic resins which cause the above-mentioned reaction induction type phase decomposition are combinations of resins which induce spinodal decomposition by once producing phase dissolution state of the precursor (A) with the remaining thermoplastic resin component (B1) and/or a precursor (B2) of the remaining thermoplastic resin component before the chemical reaction and producing resins by chemical reaction of the precursor (A) with the remaining thermoplastic resin component (B1) and/or the precursor (B2) of the remaining thermoplastic resin component, and this chemical reaction is preferable to increase the molecular weight and preferable examples are condensation polymerization, addition polymerization such as radical polymerization, cation polymerization, anion polymerization, ion polymerization, etc., polyaddition, addition condensation, and polymerization reaction such as ring-opening polymerization, and also a crosslinking reaction and acoupling reaction. Among them, ring-opening polymerization using cyclic oligomer or cyclic monomers such as cyclic oligoesters, cyclic oligoamides, cyclic oligoarylene sulfides, lactones, and lactams as precursors is free from byproduct and has a relatively high reaction speed and increases the molecular weights in a short time and therefore, the supercooling degree ($|Ts-T|$) becomes high and consequently, the structure cycle in the initial process of the spinodal decomposition according to the above-mentioned relational expression becomes small and it becomes easy to make the final structure cycle of the produced polymer alloy fine and the polymerization is particularly preferable.

Specific examples of reaction induction type phase decomposition are as follows. As a case of causing chemical reaction of a precursor (A) of a thermoplastic resin component in the co-presence of a remaining thermoplastic resin component (B1), there are a method of using a diester such as bis(2-hydroxyethyl) terephthalate (BHT), a precursor of a polyester resin, or a cyclic oligoester as the precursor (A), causing phase dissolution of one or more kinds of the thermoplastic resin component (B1) selected from polyether imide, thermoplastic polyimide, polyalkylene oxides, and celluloses such as cellulose triacetate, cellulose diacetate, cellulose acetate, cellulose propionate, methyl cellulose, and ethyl cellulose in the precursor (A), polymerizing the precursor (A), and causing phase decomposition and a method using a cyclic oligoarylene sulfide, a precursor of a polyarylene sulfide resin, as the precursor (A), causing phase dissolution of one or more kinds of the thermoplastic resin component (B1) selected from polyalkylene oxides, polyether imide, thermoplastic polyimide, poly(2,4,6-tribromostyrene), polyvinyl butyral, polyvinylpyrrolidone, poly(isobutyl methacrylate), poly-α-methylstyrene, and celluloses such as cellulose triacetate, cellulose diacetate, cellulose acetate, cellulose propionate, methyl cellulose, and ethyl cellulose in the precursor (A), polymerizing the precursor (A), and causing phase decomposition.

Polyalkylene oxides in the present invention include polyalkylene oxides such as polyethylene glycol, polyethylene oxide, polypropylene glycol, etc.; compounds obtained by substituting some or all of the terminal hydroxyl groups of polyalkylene oxides with at least one functional group selected from an alkyl ether group, an alkyl, a lauryl, an oleyl, a stearyl, an arylene, a carboxyl, an aldehyde group, an ether group, an amino group, an amido group, an acrylate group, a vinyl, and a methacrylate group; and copolymers containing them.

Herein, in the case where the terminal hydroxyl groups of a polyalkylene oxide is reacted with the precursor (A), the reaction of the terminal hydroxyl groups can be suppressed by substituting the terminal hydroxyl groups with an alkyl ether group, or the like, or using a polyalkylene glycol with a high molecular weight of 100000 or more.

Further, as a case of chemical reaction of a precursor (A) of a thermoplastic resin component in the co-presence of a precursor (B2) of the remaining thermoplastic resin component, there is a method of using a diester such as bis(2-hydroxyethyl) terephthalate (BHT), a precursor of a polyester resin, or a cyclic oligoester as the precursor (A), causing phase dissolution of one or more kinds of the precursor (B2) of the thermoplastic resin component selected from polyester, polyamide, polyarylene sulfide, polycarbonate, polystyrene, poly(methacrylic acid ester), poly(acrylic acid ester), and polyacrylonitrile in the precursor (A), polymerizing the precursor (A) and the precursor (B), and causing phase decomposition.

In the case of polymerization of the precursor (A) and/or the precursor (B2), a polymerization catalyst is added if necessary. The polymerization catalyst can be metal catalysts, acid or base catalysts, etc., and properly selected in accordance with the polymerization reaction and for example, in the case of polymerization of bis(2-hydroxyethyl) terephthalate, a precursor of poly(ethylene terephthalate), preferable to be used are antimony trioxide, titanium oxide, germanium oxide, and acetic acid salts of transition metals such as zinc, cobalt, nickel, etc. In this case, the addition amount is preferably 0.001% by mole or higher and 0.1% by mole or lower to bis(2-hydroxyethyl) terephthalate. If the molecular weight of the precursor (A) is too high, the solubility in the remaining resin to be alloyed may be lowered, and therefore, it is preferably 1500 or lower, more preferably 1200 or lower, and even more preferably 1000 or lower. Since the solubility in the resin becomes higher as the molecular weight is lower, the lower limit of the molecular weight is not particularly limited; however, those with a molecular weight of 100 or higher can be used.

Also, with respect to the molecular weight of the precursor (B2) of the remaining thermoplastic resin, if it is too higher, the solubility in the precursor (A) is lowered, and therefore, it is preferably 10000 or lower, more preferably 5000 or lower, and even more preferably 3000 or lower. Since the solubility in the precursor (A) is increased more as the molecular weight is smaller, the lower limit of the molecular weight is not particularly limited; however, those with molecular weight of 100 or more can be used.

Further, in the case where at least one component is a crystalline resin among the resin components composing a polymer alloy, the structure of the polymer alloy becomes easy by crystallization of the crystalline resin phase and therefore, it is preferable to select a crystalline resin for at least one component.

Herein, a crystalline resin in the present invention is not particularly limited if it is a resin observed to have a crystalline melting temperature by a differential scanning calorimeter (DSC), and examples may be polyester resins, polyamide resins, polyarylene sulfide resins, polyimide resins, polyether ether ketone resins, etc.

Examples of the above-mentioned polyester resins are polymers or copolymers obtained by condensation reaction of dicarboxylic acids (or their ester-formable derivatives) and diols (or their ether-formable derivatives) as main components or mixtures of the polymers and copolymers.

Examples of the above-mentioned dicarboxylic acids are aromatic dicarboxylic acids such as terephthalic acid, isophthalic acid, phthalic acid, 2,6-naphthalenedicarboxylic acid, 1,5-napthalenedicarboxylic acid, bis(p-carboxyphenyl) methane, anthracenedicarboxylic acid, 4,4'-diphenyl ether dicarboxylic acid, and 5-sodiumsulfoisophthalic acid; aliphatic dicarboxylic acids such as adipic acid, sebacic acid, azelaic acid, and dodecanedioic acid; alicyclic dicarboxylic acids such as 1,3-cyclohexanedicarboxlic acid and 1,4-cyclohexanedicarboxlic acid; and their ester-formable derivatives. Also, examples of the diol components are aliphatic glycols with carbon number of 2 to 20 such as ethylene glycol, propylene glycol, 1,4-butanediol, neopentyl glycol, 1,5-pentanediol, 1,6-hexanediol, decamethylene glycol, cyclohexanedimethanol, and cyclohexanediol; long chain glycols with molecular weight of 400 to 6000 such as polyethylene glycol, poly-1,3-propylene glycol, ad polytetramethylene glycol; and their ester-formable derivatives.

Preferable examples of polymers and copolymers of them are polybutylene terephthalate, polybutylene (terephthalate/ isophthalate), polybutylene (terephthalate/adipate), polybutylene (terephthalate/sebacate), polybutylene (terephthalate/ decanedicarboxylate), polybutylene naphthalate, polyethylene terephthalate, polyethylene (terephthalate/ isophthalate), polyethylene (terephthalate/adipate), polyethylene (terephthalate/5-sodiumsulfoisophthalate), polybutylene (terephthalate/5-sodiumsulfoisophthalate), polyethylene naphthalate, and polycyclohexanedimethylene terephthalate; and in term of formability of polyester compositions, particularly preferable are polybutylene terephthalate, polybutylene (terephthalate/adipate), polybutylene (terephthalate/decanedicarboxylate), polybutylene naphthalate, polyethylene terephthalate, polyethylene (terephthalate/ adipate), polyethylene naphthalate, and polycyclohexanedimethylene terephthalate and even more preferable is polybutylene terephthlate. Further, preferable among the polyester resins are those having intrinsic viscosity of 0.36 to 1.60 dl/g, particularly 0.52 to 1.35 dl/g measured at 25° C. in form of an o-chlorophenol solution in terms of mechanical characteristics and formability.

Successively, the change of the phase separation structure size at the time of molding will be described. As a characteristic of polymer materials, formability into a desired shape by a molding method such as injection molding and extrusion molding can be exemplified. Similarly to that, a polymer alloy is also molded into a desired shape by the above-mentioned molding method and supplied as a product. In the above-mentioned molding method, a resin is heated and melted to a temperature equal to or higher than the glass transition temperature and equal to or lower than the decomposition temperature and the melted resin is to be molded by using metal caps or dies having various shapes. At that time, there is concern that the respective polymer phases are diffused, united or separated by melting a polymer alloy to result in change of the phase separation structure size. That is, there is a risk that molding of a polymer alloy having a desired phase separation structure size in the stage before molding changes the phase separation structure size and lowers the physical properties of the polymer alloy.

With respect to such a problem, taking the phase separation structure size change by molding into consideration, setting of the phase separation size of the raw material polymer alloy is carried out; however, there are problems that in the case where the molding condition is changed, it is required to adjust again the phase separation structure size of the raw material polymer alloy or it is made impossible to diverse the polymer alloy to other molded products.

Therefore, the present invention is characterized in that a radiation ray is irradiated to a molded product of a polymer alloy provided with a desired phase separation structure in a desired size at the time of polymer alloy production or a molded product of the polymer alloy to crosslink molecules so that the mobility of molecules at the time of melting can be lowered and the change of the phase separation structure size at the time of melting in the molding process can be suppressed.

Further, in a melted state, coarsening of the phase separation structure may possibly proceed also during the radiation ray irradiation. Therefore, it is also possible that at the moment the phase separation structure reaches a desired size during the polymer alloy production, the structure fixation is carried out by quenching the polymer alloy to the glass transition temperature or lower and thereafter the radiation ray irradiation is performed.

The type of the radiation ray is not particularly limited if it can crosslink the molecules composing the polymer alloy; however, electron beam and γ-ray having relatively high energy are preferably employed. Particularly, electron beam is preferable since being possible to be radiated on-line and relatively easy to control the dose. However, in the case where the polymer alloy is thick, it is needed to pay attention since it is possible to generate distribution of the absorption dose of the radiation ray due to low penetration force of the electron beam. In such a case, it is also possible to radiate electron beam to the object to be radiated from both sides. Further, even radiation is made possible by using γ-ray with high penetration force as compared with electron beam.

The shape of the polymer alloy to which the radiation ray is radiated may be any shape such as gut-form, pellet-form, film-form, sheet-form, ribbon-form, or fibrous shapes.

In accordance with the types of polymers, disconnection reaction is promoted prior to a crosslinking reaction of molecular chains by radiation rays irradiation, and therefore, it is needed to pay attention. In general, examples of the polymers of which disconnection reaction is promoted generally prior are polyisobutylene, poly(α-styrene), polytetrafluoroethylene, poly(methyl methacrylate), polyvinyl butyral, polyoxymethylene, epoxy resins, and celluloses. On the other hand, examples of polymers with which a crosslinking reaction is promoted prior are polyethylene, polypropylene, polystyrene, poly(vinyl chloride), a polyvinyl alcohol, polyacrylonitrile, polybutadiene, polychloroprene, a styrene/ acrylonitrile copolymer, a styrene/butadiene copolymer, polyethylene chloride, polyamides, polyesters, polyurethanes, aliphatic polysulfones, polyacrylates, poly(ether ether ketone), etc. The present invention is applicable for compositions containing at least one or more kinds of these polymers.

With respect to the dose of the radiation ray, it cannot be generalized since it differs depending on the types of polymers composing a polymer alloy; however, the conditions can be set based on preliminary experiments with various dose. If the dose is too low, the crosslinking reaction may not possibly be promoted sufficiently and reversely, if the dose is too high, not only the irradiation cost becomes high but also the irradiation time becomes long to result in considerable decrease of productivity and more over, the crosslinking reaction is promoted too much and it results in a risk of impossibility of melting. Generally, the absorption dose is preferably 10 kGy or higher and 5000 kGy or lower, more preferably 25 kGy or higher and 3000 kGy or lower, and even more preferably 50 kGy or higher and 1000 kGy or lower. Measurement of the radiation dose can easily be measured by radiating radiation ray to a common dose meter simultaneously to a sample.

The reaction by the radiation ray irradiation is a reaction of mainly using radicals as active species. Consequently, coexistence of a substance reactive with the radicals in the reaction system possibly leads to considerably different consequence and it is required to pay attention. For example, if radiation ray irradiation is carried out in oxygen atmosphere, a radiation ray oxidation reaction is promoted and even in the case of the above-mentioned polymers with which the crosslinking reaction is promoted prior, there is a risk of promotion of a disconnection reaction of the main chains. In such a case, the risk can be prevented by carrying out the radiation ray irradiation in inert gas atmosphere of argon or nitrogen or using an oxygen absorbent in combination.

Reversely, it is also possible to positively use a substance reactive with the radicals. For example, if radical trapping agents such as ascorbic acid, sodium pyrosulfite, primary alcohols, secondary alcohols, or the like are added to the system, these compounds are preferentially reacted with the radicals, therefore the disconnection reaction of the polymer can be controlled.

In the case of radiation ray irradiation, a short time treatment with low dose reduces the cost. Further, it is important that the dose is suppressed to be low to suppress deterioration of the polymers by radiation rays. In such a case, it is possible to use radiation crosslinking aids such as polyfunctional monomers in combination to improve the efficiency of crosslinking reaction. Examples of the radiation crosslinking aids are tetramethylene glycol dimethacrylate, trimethoxyethoxysilane, divinylbenzene, diallyl phthalate, triallyl isocyanurate, trimethylolpropane trimethacrylate, trimethylolpropane triacrylate, tetradimethylolmethane tetramethacryalte, etc. Furthermore, it is also possible to add at least one or more kinds of rubbery polymers to a polymer alloy of the invention in order to improve impact strength and hydrolysis resistance at the time of humid and hot.

Examples of the above-mentioned rubbery polymers are polybutadiene, polyisoprene, styrene-butadiene random copolymers and block copolymers, hydrogenated products of the block copolymers, diene type rubbers such as an acrylonitrile-butadiene copolymer and a butadiene-isoprene copolymer, ethylene-propylene random copolymers and block copolymers, ethylene-butene random copolymers and block copolymers, copolymers of ethylene and α-olefines, ethylene-unsataurated carboxylic acid ester copolymers such as ethylene-methacrylate and ethylene-butyl acrylate, acryl rubber such as acrylic acid ester-butadiene copolymers, a butyl acrylate-butadiene copolymer, copolymers of ethylene and fatty acid vinyl esters such as ethylene-vinyl acetate, ethylene-propylene-nonconjugated diene ternary copolymers such as an ethylene-propylene-hexadiene copolymer, a butylene-isoprene copolymer, and polyethylene chloride, etc.

Further, addition of a third component, which is a copolymer such as a block copolymer, a graft copolymer, and a random copolymer, containing another component for composing a polymer alloy to an polymer alloy composed of two components of resins of the invention lowers the free energy in the interface between phase-decomposed phases and makes it easy to control the structure cycle in the both-phase continuous structure and the interparticle distance of dispersed particles in the dispersion structure, and therefore, it is preferable. In this case, generally, since the third component, which is such a copolymer, is distributed to the respective phases of the polymer alloy composed of two components of resins excluding the component, it can be handled in the same manner as the polymer alloy composed of two components of resins.

The composition of the resin components composing a polymer alloy of the invention is not particularly limited; however, in case of two components, generally a range of 95 mass %/5 mass % to 5 mass %/95 mass % is preferable to be employed, a range of 90 mass %/10 mass % to 10 mass %/90 mass % is more preferable, and particularly, if it is a range of 75 mass %/25 mass % to 25 mass %/75 mass %, the both-phase continuous structure can be obtained relatively easily and thus it is preferably employed.

In addition, other various kinds of additives may be added to an extent that the object of the present invention is adversely detracted. Examples of other additives are reinforcing materials and non-plate-like fillers such as talc, kaolin, mica, clay, bentonite, sericite, basic magnesium carbonate, aluminum hydroxide, glass flakes, glass fibers, carbon fibers, asbestos fibers, rock wool, calcium carbonate, silicic sand, wallastonite, barium sulfate, glass beads, and titanium oxide; antioxidants (phosphorus type, sulfur type, etc.), ultraviolet absorbents, heat stabilizers (hindered phenol type), lubricants, releasing agents, antistatic agents, blocking preventing agents, coloring agents including dyes and pigments, flame-retardants (halogen type, phosphorus type, etc.), flame-retardation aids (antimony compounds represented by antimony trioxide, zirconium oxide, molybdenum oxide, etc.), foaming agents, coupling agents (silane coupling agents and titanium coupling agents containing one or more kinds of epoxy groups, amino groups, mercapto groups, vinyl groups, isocyanate groups), anti-bacterial agents, and so forth.

These additives may be added in an arbitrary step in production of a polymer alloy of the present invention and examples may include a method of adding them simultaneously at the time of adding at least two components of resins, a method of adding them after two components of resins are previously melted and kneaded, and a method of adding them to one resin at first, melt-kneading the mixture, and thereafter, adding remaining resin.

A molding method of a polymer alloy obtained by the invention may be an arbitrary method and a molding shape may be an arbitrary shape. Examples of the molding method may include injection molding, extrusion molding, inflation molding, and blow molding, and especially, the injection molding is preferable since phase dissolution is caused in the plasticization process at the time of injection, after the injection, a polymer alloy is subjected to spinodal decomposition, and heat treatment and structure fixation can be carried out simultaneously in a metal mold, and also in the case of film and/or sheet extrusion molding, phase dissolution is caused at the time of extrusion and after discharge, spinodal decomposition is caused and heat treatment is carried out at the time of film and/or sheet stretching, and thereafter, the structure fixation can be carried out at the time of spontaneous cooling before rolling, and therefore, it is preferable. Of course, it is also possible to carry out structure formation by carrying out heat treatment separately for the above-mentioned molded product. Also, as a film and/or sheet-forming production method, there are a method forming a sheet by melting and extruding resins out of a T die by using a uniaxial or biaxial extruder and cooling and solidifying melted resins by a casting drum, a polishing method for molding a melted and extruded sheet between two rolls, and a calendaring method;

however, the method is not particularly limited here. Further, in the case of casing by a casting drum, to closely stick melted resins to the casting drum, there are a method of applying static electricity, a method of using an air knife, a method of using a drum for pressing facing to the casting drum, and so forth. Furthermore, it is more preferable to use pellets previously subjected to phase dissolution to freeze the structure by a biaxial extruder before they are supplied to a film and/or sheet-forming extruder. Also, the method for film formation by stretching is not particularly limited and may be successive biaxial stretching or simultaneous biaxial stretching, and generally, the stretching magnification ratio is often between 2 to 8 times as large and the stretching speed is often between 500 to 5000%/minute. A method of heat treatment at a temperature lowest among the glass transition temperatures of the respective resin components composing a polymer alloy as the heat treatment temperature at the time of stretching is generally employed preferably; however, in the case where a polymer alloy is in the phase dissolution state and has a single glass transition temperature or in the state that the phase decomposition is proceeding and has a glass transition temperature between the glass transition temperatures of the respective resin components composing the polymer alloy, it is preferable to carry out heat treatment at the lowest temperature among the glass transition temperatures of the polymer alloy or higher. Also, in the case where a crystalline resin is used as an individual resin component composing a polymer alloy, to keep the heat treatment temperature at the heat crystallization temperature of the crystalline resin is preferable from a viewpoint that the crystalline resin is made hard to receive inhibition of stretching by crystallization.

A polymer alloy in the present invention can be used in various utilization methods, generally depending on the characteristics of constituent components of the polymer alloy, and especially, the polymer alloy is preferably usable for structure materials with improved impact resistance using a resin excellent in impact resistance as one resin, heat resistant resin materials with improved heat resistance by using a resin excellent in heat resistance as one resin, and functional resin materials in which functional components are finely dispersed by depositing a magnetic body, a catalyst, or the like in one resin. The polymer alloy can also be preferably usable for transparent resin materials by utilizing that the structure control of the invention is also possible at a wavelength of visible light or less.

Structure materials with improved impact resistance described above may be used preferable for, for example, automotive parts and electric and electronic parts. Examples of the automotive parts are alternator terminals, alternator connectors, IC regulators, potentiometer bases for light deer, snorkels of air intake nozzles, intake manifolds, air flow meters, air pumps, fuel pumps, engine cooling water joints, thermostat housings, carburetor main bodies, carburetor spacers, engine mounds, ignition bobbins, ignition cases, clutch bobbins, sensor housings, idle speed control valves, vacuum switching valves, ECU housings, vacuum pump cases, inhibitor switches, rotation sensors, acceleration sensors, distributor caps, coil bases, actuator cases for ABS, tops and bottoms of radiator tanks, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various kinds of cases, various kinds of tubes relevant to fuels, exhaust systems, and intake systems, various kinds of tanks, various kinds of hoses relevant to fuels, exhaust systems, and intake systems, various kinds of clips, various kinds of valves such as exhaust gas valves or the like, various kinds of pipes, exhaust gas sensors, cooling water sensors, oil temperature sensors, brake pat wear sensors, brake pad wear sensors, throttle position sensors, crank shaft position sensors, thermostat bases for air conditioners, panel switch substrates for air conditioners, warming hot air flow control valves, brush holders for radiator motors, water pump impellers, turbine vanes, wiper motor-relevant parts, step motor rotors, brake pistons, solenoid bobbins, engine oil filters, ignition apparatus cases, torque control levers, starter switches, starter relays, safety belt parts, register blades, washer levers, window regulator handles, knobs of window regulator handles, passing light levers, distributors, sun visor brackets, various kinds of motor housings, roof rails, fenders, garnishes, bumpers, door mirror stays, horn terminals, window washer nozzles, spoilers, hood louvers, wheel covers, wheel caps, grill apron cover frames, lamp reflectors, lamp sockets, lamp housings, lamp bezels, door handles, and various kinds of connectors such as wire harness connectors, SMJ connectors, PCB connectors, door grommet connectors, and connectors for fuse.

Further, examples of the electric and electronic parts are connectors, coils, various kinds of sensors, LED lamps, sockets, resistors, relay cases, compact switches, coil bobbins, capacitors, variable capacitor cases, optical pick-ups, oscillators, various kinds of terminal plates, transformers, plugs, printed boards, tuners, speakers, microphones, headphones, small type motors, magnetic head bases, power modules, semiconductors, liquid crystals, FDD carriages, FDD chassis, motor brush holders, satellite dishes, computer-related parts, generators, electric motors, potential transformers, current transformers, voltage adjusters, rectifiers, inverters, relays, contacts for electric power, switchgears, crossing bars, knife switches, multipolar rods, electric part cabinets, VTR parts, television parts, smoothing irons, hair driers, rice cooking parts, microwave parts, acoustic parts, phonetic appliance parts such as audio laser disks (registered trade name), compact disks, DVD, etc., lighting parts, refrigerator parts, air conditioner parts, typewriter parts, word processor parts, office computer-related parts, telephone-related parts, mobile phone-related parts, facsimile-related parts, copying machine-related parts, washing, tools, motor parts, lighters, typewriter-related parts, optical appliance/precision mechanical equipment-related parts such as microscopes, binoculars, cameras, watches, and the like.

Further, use of a hydrophilic polymer or a precursor of a hydrophilic polymer gives hydrophilicity to a polymer alloy. Compatibility with blood of medical materials is improved, adhesion of bulk proteins to bio-tools such as protein chips is prevented, biofouling of separation membranes for water treatment, and antifogging properties of optical materials are improved by providing hydrophilicity. Practical examples of the medical materials are artificial blood vessels, catheters, blood bags, contact lenses, intraocular lenses, surgical adjunctive equipments, blood purification modules, and so forth. Examples of the bio-tools are protein chips, DNA chips, biogenic substance separation membranes, bio-experiments-related instruments, bioreactors, and so forth.

Hereinafter, the present invention will be described with reference to the following examples; however, the invention should not be limited to these examples.

EXAMPLES

Examples 1 to 3

Preparation of PEI

A chloroform solution of polyether imide ("Ultem 1010" manufactured by SABIC Innovative Plastics, hereinafter abbreviated as PEI) in 6.25% by mass was dropwise added to hexane and PEI was powdered by re-precipitation. The powdered PEI was vacuum dried at 50° C. for 24 hours and agglomerates were completely pulverized in a mortar.

(PET/PEI Alloy)

Using bis(2-hydroxyethyl)terephthalate (Code: 465151-500G, Sigma Aldrich Japan Co., Ltd., hereinafter abbreviated as BHT), a precursor of poly(ethylene terephthalate) (hereinafter abbreviated as PET), as a precursor (A); PEI prepared in the above-mentioned manner as a thermoplastic resin component (B1); and antimony trioxide (Code: 018-04402, manufactured by Wako Pure Chemical Industries, Ltd.) as a polymerization catalyst, these compounds were mixed at ratios shown in Table 1 and fed to 500 ml-glass test tubes of reaction containers. After the reaction containers were replaced with nitrogen, polymerization was started by heating and stirring. In 30 minutes from starting heating, it reached 325° C. and immediately after that, heating was stopped and pressure reduction was started. Produced ethylene glycol was removed out of the reaction system and polymerization was further promoted. After 15 minutes, it reached 290° C. and the inner pressure of the reaction containers reached 0.2 kPa. Thereafter, heating and stirring were carried out at 290° C. and 0.2 kPa for 90 minutes. On completion of heating, the reaction products were quickly discharged to water and quenched to fix the structures and obtain transparent yellow gut-form samples.

The samples were analyzed by infrared absorption spectrometry (FTIR-8100A, manufactured by Shimadzu Corporation) and consequently, signals derived from PET and signals derived from PEI were observed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weights of PET were as shown in Table 1. Further, it was confirmed that a bicontinuous structure of two phases was formed by transmission electron microscopic observation. From the above-mentioned results, it was understood that the transparent yellow gut-form samples were PET/PEI alloys.

The above-mentioned gut-form samples were thermally pressed at 260° C. and 1.5 MPa to produce sheets (thickness 0.1 mm) of which small angle x-ray scattering spectra were measured. The peak half width (a), peak maximum wavelength (b), (a)/(b), and the value of the structure cycle in the spectra are shown in Table 1.

After being stretched at 100° C. by 3.5 times as long in the vertical direction, each sheet was stretched at 85° C. by 4.0 times as wide in the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. The results are shown in Table 1. Spinodal decomposition was induced by increasing molecular weight by BHT polycondensation to carry out polymer alloying and consequently the numeral value of (a)/(b) calculated from the peak half width (a) and the peak maximum wavelength (b) was 1.2 or lower and the polymer alloys with high evenness of the structure were obtained. These polymer alloys were found having excellent mechanical characteristics as compared with those of Comparative Examples 1 to 3.

(Preparation of PET)

After 100 g of BHT (Code: 465151-500G, Sigma Aldrich Japan Co., Ltd.) 100 g and 23 mg of antimony trioxide (Code: 018-04402, manufactured by Wako Pure Chemical Industries, Ltd.) as a polymerization catalyst were mixed, these compounds were fed to a 500 ml-glass test tube of a reaction container. After the reaction container was replaced with nitrogen, polymerization was started by heating and stirring. In 30 minutes from starting heating, it reached 290° C. and pressure reduction was started. Produced ethylene glycol was removed out of the reaction system and polymerization was further promoted. After 15 minutes, the inner pressure of the reaction containers reached 0.2 kPa. Thereafter, heating and stirring were carried out at 290° C. and 0.2 kPa for 120 minutes. On completion of heating, the reaction product was quickly discharged to water and quenched to fix the structure and obtain a colorless transparent gut-form sample. The sample was analyzed by infrared absorption spectrometry (FTIR-8100A, manufactured by Shimadzu Corporation) and consequently, a signal derived from PET was observed. Further, the sample was dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that PET having a number average molecular weight of 12200 and a weight average molecular weight of 28300 was obtained. The PET was used for the following Examples and Comparative Examples.

Comparative Examples 1 to 3

As Comparative Examples, alloying by melt-kneading was carried out, using two kinds of thermoplastic resins. PET and PEI in compositions shown in Table 1 were supplied to a biaxial screw extruder (PCM-30, manufactured by Ikegai Ltd.) set at an extrusion temperature of 300° C. and guts discharged out of dies were quenched in water to fix the structures and obtain gut-form samples. The gut-form samples were thermally pressed at 260° C. and 1.5 MPa to produce sheets (thickness 0.1 mm) of which small angle x-ray scattering spectra and light scattering spectra were measured. The peak half width (a), peak maximum wavelength (b), (a)/(b), and the value of the structure cycle in the spectra are shown in Table 1. The peak half width was significantly large and (a)/(b) exceeded 1.2. Further, since the half width was large, no peak was observed in Comparative Examples 1 and 2. After being stretched at 100° C. by 3.5 times as long in the vertical direction, each sheet was stretched at 85° C. by 4.0 times as wide the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. Consequently, as shown in Table 1, it was found that both of the tensile strength and modulus of elongation were not so much changed as compared with those of PET (Comparative Example 4).

Comparative Example 4

As a control to alloys, PET alone was used for comparison. PET was thermally pressed at 270° C. and 1.5 MPa to produce a sheet (thickness 0.1 mm) which was stretched at 100° C. by 3.5 times as long in the vertical direction and thereafter stretched at 85° C. by 4.0 times as wide in the transverse direction to produce a film, and a sample with length×width=50 mm×10 mm was obtained by cutting off the film and the tensile strength and modulus of elongation were measured at a pulling speed of 300 mm/min in atmosphere of 25° C. and 65% humidity.

TABLE 1

|  |  | Example 1 | Example 2 | Example 3 | Comparative example 1 | Comparative example 2 | Comparative example 3 | Comparative example 4 |
|---|---|---|---|---|---|---|---|---|
| Raw material composition (% by weight) | BHT | 96.15 | 92.23 | 92.23 | — | — | — | — |
|  | Antimony trioxide | 0.02 | 0.02 | 0.02 | — | — | — | — |
|  | PEI | 3.83 | 7.75 | 7.75 | 5 | 10 | 20 | — |
|  | PET | — | — | — | 95 | 90 | 80 | 100 |
| Number average molecular weight |  | 10300 | 11200 | 10800 | — | — | — | — |
| Weight average molecular weight |  | 25900 | 27100 | 27000 | — | — | — | — |
| Peak half-width (a) (nm$^{-1}$) |  | 0.38 | 0.38 | 0.42 | No peak | No peak | 0.0076 | — |
| Peak maximum wavelength (b) (nm$^{-1}$) |  | 0.40 | 0.39 | 0.43 |  |  | 0.0042 | — |
| (a)/(b) |  | 0.95 | 0.97 | 0.98 |  |  | 1.81 | — |
| Structure cycle (μm) |  | 0.0025 | 0.0026 | 0.0023 | — | — | 0.24 | — |
| Tensile strength (MPa) |  | 246 | 238 | 232 | 152 | 140 | 183 | 196 |
| Modulus of elongation (GPa) |  | 4.6 | 4.3 | 4.1 | 3.1 | 2.8 | 3.7 | 3.9 |

(Preparation of Cyclic PET Oligomer)

A 50 L reaction container was charged with 10 kg of PET and 15 L of chloroform, and the mixture was heated and refluxed for 8 hours while stirring. After cooling to room temperature, a solid content was removed by filtration. Thereafter, 100 g of silica gel ("Silicagel 60", Code: 1.07734.5000, manufactured by MERK) was added and stirring was carried out for 5 minutes, the silica gel was removed by filtration and the chloroform was removed by an evaporator to obtain a white powder. This white powder was subjected to $^1$H-NMR analysis (Apparatus: 270 M Nuclear Magnetic Resonance Apparatus, manufactured by Nihon Denshi Co., Ltd., Solvent: heavy chloroform) and GPC analysis (Apparatus: LC-10AT, manufactured by Shimadzu Corporation, Columns: "TSK gel G2500H$_{XL}$", manufactured by Tosoh Corporation) and find to be a cyclic PET oligomer containing a trimer as a main component. This cyclic PET oligomer was used in Examples.

Examples 4 and 5

Using the cyclic PET oligomer, a precursor of PET, as a precursor (A); a crystalline thermoplastic polyimide (AURUM PL-450C, manufactured by Mitsui Chemicals Co., Ltd., hereinafter abbreviated as TPI(1)) as a thermoplastic resin component (B1); and antimony trioxide (Code: 018-04402, manufactured by Wako Pure Chemical Industries, Ltd.) as a polymerization catalyst, these compounds were mixed at ratios shown in Table 2 and charged in 500 ml-glass test tubes of reaction containers. After the reaction containers were replaced with nitrogen, polymerization was started by heating and stirring. In 30 minutes from starting heating, it reached 340° C. and immediately after that, heating was stopped and polymerization was carried out at 300° C. for 30 minutes. On completion of the polymerization, the reaction products were quickly discharged to water and quenched to fix the structures and obtain transparent yellow gut-form samples. The samples were analyzed by infrared absorption spectrometry (FTIR-8100A, manufactured by Shimadzu Corporation) and consequently, signals derived from PET and signals derived from TPI (1) were observed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weights of PET were as shown in Table 2. Further, it was confirmed that a bicontinuous structure of two phases was formed by transmission electron microscopic observation.

From the above-mentioned results, it was understood that the transparent yellow gut-form samples were PET/PEI alloys. The above-mentioned gut-form samples were thermally pressed at 260° C. and 1.5 MPa to produce sheets (thickness 0.1 mm) of which light scattering spectra were measured. The peak half width (a), peak maximum wavelength (b), (a)/(b), and the value of the structure cycle in the spectra are shown in Table 2. After being stretched at 100° C. by 3.5 times as long in the vertical direction, each sheet was stretched at 85° C. by 4.0 times as wide in the transverse direction and thermally fixed at 200° C. for 1 minute to produce a film which was Cut off to obtain a sample with length×width=50 mm×10 mm and the tensile strength and modulus of elongation were measured at a pulling speed of 300 mm/min in atmosphere of 25° C. and 65% humidity. The results are shown in Table 2. Spinodal decomposition was induced by increasing molecular weight by ring-opening polymerization of the cyclic PET oligomer to carry out polymer alloying and consequently the numeral value of (a)/(b) calculated from the peak half width (a) and the peak maximum wavelength (b) was 1.2 or lower and the polymer alloys with high evenness of the structure were obtained. These polymer alloys were found having excellent mechanical characteristics as compared with those of Comparative Examples 4 and 5. As shown in Table 2, both tensile strength and modulus of elongation were excellent as compared with those of PET (Comparative Example 4).

Comparative Example 5

As Comparative Example, alloying was carried out in the same manner as Example 4, except that a cyclic PET oligomer of a decamer (molecular weight 1920) as a main component was used.

As a result, sine the molecular weight of the cyclic PET oligomer was 1500 or higher, phase dissolution with TPI (1) was not cause and an opaque gut-form sample was obtained. The sample was observed by an optical microscope to find that it had a structure in which TPI (1) was coarsely dispersed in PET, that is, a dispersion structure in which those with structure sizes from several μm to several hundreds μm were intermixed. Further, the sample was dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weight of PET was as shown in Table 2. Further, it was confirmed that a bicontinuous structure of two phases was formed by transmission electron microscopic observation. The above-mentioned gut-form sample was thermally pressed at 260° C. and 1.5 MPa to produce a sheet (thickness 0.1 mm) of which a small angle x-ray scattering spectrum and a light scattering spectrum were measured and found that no peak was observed. After being stretched at 100° C. by 3.5 times as long in the vertical direction, the sheet was stretched at 85° C. by 4.0 times as wide in the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. As a result, as shown in Table 2, it was found that both tensile strength and modulus of elongation were significantly lowered as compared with those of PET (Comparative Example 4).

Comparative Examples 6 and 7

As Comparative Examples, alloying by melt-kneading was carried out, using two kinds of thermoplastic resins. PET and TPI (1) in compositions shown in Table 2 were supplied to a biaxial screw extruder (PCM-30, manufactured by Ikegai Ltd.) set at an extrusion temperature of 350° C. and guts discharged out of dies were quenched in ice water to fix the structures and obtain pale yellow gut-form samples. The samples were observed by an optical microscope to find that the samples had a structure in which TPI(1) was coarsely dispersed in PET, that is, a dispersion structure in which those with structure sizes from several μm to several hundreds μm were intermixed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the number average molecular weights of PET were decreased to 5000 or lower. The above-mentioned gut-form samples were thermally pressed at 260° C. and 1.5 MPa to produce sheets (thickness 0.1 mm) of which small angle x-ray scattering spectra and light scattering spectra were measured and found that no peak was observed. After being stretched at 100° C. by 3.5 times as long in the vertical direction, the sheets were stretched at 85° C. by 4.0 times as wide in the transverse direction and thermally fixed at 200° C. for 1 minute to produce films which were cut off to obtain samples with length×width=50 mm×10 mm and the tensile strength and modulus of elongation were measured at a pulling speed of 300 mm/min in atmosphere of 25° C. and 65% humidity. As a result, as shown in Table 2, both tensile strength and modulus of elongation were significantly lowered as compared with those of PET (Comparative Example 4).

TABLE 2

|  |  | Example 4 | Example 5 | Comparative example 5 | Comparative example 6 | Comparative example 7 |
|---|---|---|---|---|---|---|
| Raw material composition (% by weight) | Cyclic PET oligomer (trimer) | 94.98 | 89.98 | — | — | — |
|  | Cyclic PET oligomer (detamer) | — | — | 94.98 | — | — |
|  | Antimony trioxide | 0.02 | 0.02 | 0.02 | — | — |
|  | TPI [1] | 5 | 10 | 5 | 5 | 10 |
|  | PET | — | — | — | 95 | 90 |
| Number average molecular weight |  | 13500 | 13000 | 14100 | — | — |
| Weight average molecular weight |  | 29600 | 28900 | 29900 | — | — |
| Peak half-width (a) (μm$^{-1}$) |  | 2.13 | 2.50 | — | — | — |
| Peak maximum wavelength (b) (μm$^{-1}$) |  | 2.33 | 2.48 | — | — | — |
| (a)/(b) |  | 0.91 | 1.01 | — | — | — |
| Structure cycle (μm) |  | 0.43 | 0.40 | — | — | — |
| Tensile strength (MPa) |  | 227 | 219 | 95 | 98 | 103 |
| Modulus of elongation (GPa) |  | 4.1 | 3.9 | 1.5 | 1.6 | 1.9 |

(Preparation of Cyclic PPS Oligomer)

A 70 L autoclave equipped with a stirrer was charged with 8.27 kg (70.0 mole) of 47.5% sodium hydrosulfide, 2.96 kg (71.0 mole) of 96% sodium hydroxide, 11.44 kg (116 mole) of N-methyl-2-pyrrolidone (hereinafter, sometimes abbreviated as NMP), 1.72 kg (21.0 mole) of sodium acetate, and 10.5 Kg of ion exchanged water and while nitrogen was introduced at normal pressure, the mixture was gradually heated to about 240° C. in about 3 hours and after 14.8 kg of water and 280 g of NMP were removed through a refining tower, the reaction container was cooled to 160° C. Additionally, hydrogen sulfide at a ratio of 0.02 mole per 1 mole of a sulfur component fed during the dewatering operation was diffused outside of the reaction system.

Next, 10.3 kg (70.3 mole) of p-dichlorobenzene and 9.00 kg (91.0 mole) of NMP were added and the reaction container was tightly sealed in nitrogen gas. While being stirred at 240 rpm, the mixture was heated to 270° C. at a speed of 0.6° C./min and kept at the temperature for 140 minutes. While 1.26 kg (70 mole) of water was injected by pressure in 15 minutes, the reaction mixture was cooled to 250° C. at a speed of 1.3° C./min. Thereafter, being cooled to 220° C. at a speed of 0.4° C./min, the reaction mixture was quenched to around room temperature to obtain a slurry (A). This slurry (A) was diluted with 20.0 kg of NMP to obtain a diluted slurry (B). The slurry (B) heated to 80° C. was filtered by a sieve (80 mesh, 0.175 mm opening) to obtain granular PPS resin containing the slurry as a mesh-on component and about 7.5 kg of a slurry (C) as a filtrate component.

After 1000 g of the obtained slurry (C) was fed to a rotary evaporator and purging with nitrogen was carried out, the slurry water treated at 100 to 150° C. for 1.5 hours in reduced pressure and successively at 150° C. for 1 hour by a vacuum drier to obtain a solid content. After 1200 g (1.2 times as much as the slurry (C)) of ion exchanged water was added to the solid content, the mixture was stirred at 70° C. for 30 minutes to produce a slurry again. The slurry was suction-filtered by a glass filter with opening of 10 to 16 μm. The obtained white cake was mixed with 1200 g of ion exchanged water and stirred at 70° C. for 30 minutes to produce a slurry again which was similarly suction-filtered and vacuum dried at 70° C. for 5 hours to obtain 11.0 g of a polyphenylene sulfide mixture 1. GPC measurement of this polyphenylene sulfide mixture was carried out to find that the number average molecular weight (Mn) was 5200 and the weight average molecular weight (Mw) was 28900 and it was found by chromatogram analysis that the mass fraction of the components with a molecular weight of 5000 was 39% and the mass fraction of the components with a molecular weight of 2500 was 32%. The polyphenylene sulfide mixture 5 g was sampled and 120 g of chloroform was used as a solvent and the polyphenylene sulfide mixture and the solvent were brought into contact with each other at a bath temperature of about 80° C. for 3 hours by Soxhlet extraction method to obtain an extract. The extract was like a slurry containing a partially solid-like component at room temperature.

After chloroform was removed from the extract slurry by using an evaporator, the slurry was treated at 70° C. for 3 hours by a vacuum drier to obtain 2.1 g of a solid content (yield 42% to the polyphenylene sulfide mixture 1). From the molecular weight data measured by infrared absorption spectrometry (FTIR-8100A, manufactured by Shimadzu Corporation), mass spectroscopy (Apparatus: M-1200H, manufactured by Hitachi, Ltd.) of components fractionated by high performance chromatography (Apparatus: LC-10 manufactured by Shimadzu Corporation, Columns: C18, Detector: Photodiode array), and also by MALDI-TOF-MS, the solid content obtained in the above-mentioned manner was found to be a mixture of cyclic polyphenylene sulfide oligomers (abbreviated as cyclic PPS oligomers) with repeating unit number of 4 to 12 as main components.

Example 6

Using the cyclic PET oligomers, precursors of PET, as a precursor (A); a cyclic PPS oligomer, a precursor of a thermoplastic resin component PPS, as a precursor (B2); and antimony trioxide (Code: 018-04402, manufactured by Wako Pure Chemical Industries, Ltd.) as a polymerization catalyst, these compounds were mixed at a ratio shown in Table 3 and fed to a 500 ml-glass test tube of a reaction container. After the reaction container was replaced with nitrogen, polymerization was started by heating and stirring. In 30 minutes from starting heating, it reached 300° C. and heating and stirring were carried out for 150 minutes. On completion of the heating, the reaction product was quickly discharged to water and quenched to fix the structure and obtain a transparent brown gut-form sample. The sample was analyzed by infrared absorption spectrometry (FTIR-8100A, manufactured by Shimadzu Corporation), and consequently, signal derived from PET and signal derived from PPS were observed. Further, it was confirmed that the sample formed two phase-dispersion structure by transmission electron microscopic observation. From the above-mentioned results, it was found that the above-mentioned transparent yellow gut-form sample was a PET/PPS alloy. The above-mentioned gut-form sample was thermally pressed at 300° C. and 1.5 MPa to produce a sheet (thickness 0.1 mm) of which a light scattering spectrum was measured. The peak half width (a), peak maximum wavelength (b), (a)/(b), and the value of the structure cycle in the spectrum are shown in Table 3.

After being stretched at 100° C. by 3.5 times as long in the vertical direction, the sheet was stretched at 85° C. by 4.0 times as wide in the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. The results are shown in Table 3. Spinodal decomposition was induced by increasing a molecular weight by ring-opening polymerization of the cyclic PET oligomers to carry out polymer alloying and consequently the numeral value of (a)/(b) calculated from the peak half width (a) and the peak maximum wavelength (b) was 1.2 or lower and the polymer alloy with high evenness of the structure was obtained. The polymer alloy was found having excellent mechanical characteristics as compared with those of a polymer alloy of Comparative Example 7 produced by melt-kneading.

Comparative Example 8

As Comparative Example, alloying by melt-kneading was carried out, using two kinds of thermoplastic resins. PET and PPS in a composition shown in Table 3 were supplied to a biaxial screw extruder (PCM-30, manufactured by Ikegai Ltd.) set at an extrusion temperature of 310° C. and a gut discharged out of a die was quenched in ice water to fix the structure and obtain a gut-form sample. The sample was observed by an optical microscope to find that the sample had a structure in which PET and PPS were coarsely dispersed, that is, a dispersion structure in which those with structure sizes from several μm to several hundreds μm were intermixed. The above-mentioned gut-form sample was thermally pressed at 300° C. and 1.5 MPa to a produce sheet (thickness 0.1 mm) of which a light scattering spectrum was measured and found that no peak was observed. After being stretched at 100° C. by 3.5 times as long in the vertical direction, the sheets were stretched at 85° C. by 4.0 times as wide in the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. As a result, as shown in Table 3, both tensile strength and modulus of elongation were significantly lowered as compared with those of PET (Comparative Example 4).

TABLE 3

| | | Example 6 | Comparative example 8 |
|---|---|---|---|
| Raw material composition (% by weight) | Cyclic PET oligomer (trimer) | 49.99 | — |
| | Cyclic PPS oligomer | 49.99 | — |
| | Antimony trioxide | 0.02 | — |
| | PET | — | 50 |
| | PPS | — | 50 |
| Peak half-width (a) (μm$^{-1}$) | | 1.39 | — |
| Peak maximum wavelength (b) (nm$^{-1}$) | | 1.26 | — |
| (a)/(b) | | 1.10 | — |
| Structure cycle (μm) | | 0.79 | — |
| Tensile strength (MPa) | | 133 | 96 |
| Modulus of elongation (GPa) | | 3.8 | 3.1 |

(Blood Compatibility Test)

Blood compatibility was tested by a human platelet adhesion test. In general, when blood is brought into contact with an artificial goods such as a polymer, it is regarded as a foreign mater and adhesion of proteins relevant to coagulation and adhesion of platelet proceed to produce blood clots. If such blood clots are formed in a catheter or a blood dialyzer, the blood vessels are clogged, and therefore, it is not preferable. Accordingly, for uses of a material to be brought into contact with blood, a blood-compatible material is used. Herein, so-called blood-compatible material means a material with low activity of blood coagulation system when being brought into contact with blood. The evaluation is carried out by the following platelet adhesion test. As the number of the adhering platelet is less, it can be said that the material has higher blood compatibility.

A double-faced tape was stuck to a circular cover glass with 18 mmϕ and a sample cut out into 3 mm square was fixed. The circular cover glass was set in a cylindrically cut Falcon (registered trade name) cylindrical tube (18 mmϕ, No. 2051) in a manner that the face bearing the sample was put in the inside of the cylindrical tube and the gaps of the installation parts were filled with Parafilm. After being washed with a normal saline solution, the inside of the cylindrical tube was filled with a normal saline solution. After venous blood of a healthy adult was collected, heparin was immediately added to be 50 U/ml concentration. After the normal saline solution of the cylindrical tube was discarded, 1.0 ml of the blood was poured in the cylindrical tube within 10 minutes after blood collection and shaken at 37° C. for 1 hour. Thereafter, the sample was washed with 10 ml of a normal saline solution and the blood components were fixed with a normal saline solution containing 2.5% by volume of glutaraldehyde and washed with 20 ml of distilled water. The washed sample was vacuum-dried at normal temperature and 0.5 Torr for 10 hours. The cylindrical cover glass was stuck to a sample stand of a scanning electron microscope by a double-faced tape. Thereafter, a thin film of platinum/palladium was formed on the sample surface by sputtering to obtain a sample for electron microscopic observation. This sample surface was observed at a magnification of 1500 times by a field emission type scanning electron microscope (S800 manufactured by Hitachi, Ltd.) and the number of adhering platelets in one field ($4.3 \times 10^3$ μm$^2$). An average value of the number of adhering platelets in ten different fields was defined as the number of adhering platelets (pieces/$4.3 \times 10^3$ μm$^2$). Since blood is easy to stagnate in the sample end parts, the parts near the center were employed as observation objects.)

Examples 7 and 8

Using bis(2-hydroxyethyl) terephthalate (Code: 465151-500G, Sigma Aldrich Japan Co., Ltd., hereinafter abbreviated as BHT), a precursor of PET, as a precursor (A); polyethylene glycol (Polyethylene glycol 3,500,000, Code: 163-22161, hereinafter abbreviated as PEG, manufactured by Wako Pure Chemical Industries, Ltd.) as a thermoplastic resin component (B1); and antimony trioxide (Code: 018-04402, manufactured by Wako Pure Chemical Industries, Ltd.) as a polymerization catalyst, these compounds were mixed at ratios shown in Table 4 and fed to 500 ml-glass test tubes of reaction containers. After the reaction containers were replaced with nitrogen, polymerization was started by heating and stirring. In 30 minutes from starting heating, it reached 290° C. and thereafter the temperature was kept at 290° C. and pressure reduction was started. Produced ethylene glycol was removed out of the reaction system and polymerization was further promoted. After 30 minutes, the inner pressure of the reaction containers reached 0.2 kPa. Thereafter, heating and stirring were carried out at 290° C. and 0.2 kPa for 90 minutes. On completion of heating, the reaction products were quickly discharged to water and quenched to fix the structures and obtain gut-form samples.

The samples were analyzed by infrared absorption spectrometry (FTIR-8100A, manufactured by Shimadzu Corporation), and consequently, signals derived from PET and signals derived from PEG were observed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weights of PET were as shown in Table 4. Further, it was confirmed that a bicontinuous structure of two phases was formed by transmission electron microscopic observation. From the above-mentioned results, it was understood that the gut-form samples were PET/PEG alloys.

Each specimen was obtained by cutting off the gut-form samples and sandwiched with cover glass and heated to 270° C. and immediately quenched in an ice water bath. The obtained samples were observed by an optical microscope to find that the PET/PEG alloys formed co-continuous structures. Therefore, light scattering spectra were measured for the above-mentioned optical microscopic samples by a light scattering apparatus. The peak half width (a), peak maximum wavelength (b), (a)/(b), and the value of the structure cycle in the spectra are shown in Table 4. Also, the above-mentioned gut samples were thermally pressed at 260° C. and 1.5 MPa to produce sheets (thickness 0.1 mm) which were subjected to static contact angle measurement with water and a blood compatibility test. The results are shown in Table 4. Spinodal decomposition was induced by increasing a molecular weight by BHT polycondensation to carry out polymer alloying and consequently the numeral value of (a)/(b) calculated from the peak half width (a) and the peak maximum wavelength (b) was 1.2 or lower, and the polymer alloys with high evenness of the structure were obtained. These polymer alloys were found having excellent hydrophilicity and blood compatibility. The PET/PEG alloys can be used preferably for providing hygroscopicity to polyester fibers and also as biomaterials.

Comparative Examples 9 and 10

As Comparative Examples, alloying of PET and PEG by melt-kneading was carried out. PET and PEG in compositions shown in Table 4 were supplied to a biaxial screw extruder (PCM-30, manufactured by Ikegai Ltd.) set at an extrusion temperature of 300° C. and guts discharged out of dies were immediately quenched in water to fix the structures and obtain gut-form samples. Each specimen was obtained by cutting off the gut-form samples and sandwiched with cover glass and heated to 270° C. and immediately quenched in an ice water bath. The samples were observed by an optical microscope to find that the samples had an island structure containing island components with various particle sizes of 1 to 100 μm. Successively, light scattering spectra were measured for the above-mentioned optical microscopic samples by a light scattering apparatus, and found that no peak was observed.

Also, the above-mentioned gut samples were thermally pressed at 260° C. and 1.5 MPa to produce sheets (thickness 0.1 mm) which were subjected to static contact angle measurement with water and a blood compatibility test. The results are shown in Table 4. It can be understood that both hydrophilicity and blood compatibility were inferior as compared with those of Examples 7 and 8.

TABLE 4

|  |  | Example 7 | Example 8 | Comparative example 9 | Comparative example 10 |
|---|---|---|---|---|---|
| Raw material composition (% by weight) | BHT | 98.45 | 96.15 | — | — |
|  | Antimony trioxide | 0.02 | 0.02 | — | — |
|  | PEG | 1.52 | 3.83 | 5 | 10 |
|  | PET | — | — | 95 | 90 |
| Number average molecular weight |  | 11700 | 11500 | — | — |
| Weight average molecular weight |  | 24300 | 23200 | — | — |
| Peak half-width (a) ($\mu m^{-1}$) |  | 1.39 | 1.28 | No peak | No peak |
| Peak maximum wavelength (b) ($\mu m^{-1}$) |  | 1.33 | 1.25 |  |  |
| (a)/(b) |  | 1.05 | 1.02 |  |  |
| Structure cycle ($\mu m$) |  | 0.75 | 0.80 | — | — |
| Contact angle with water (deg) |  | 46.7 | 43.8 | 78.3 | 76.2 |
| Number of adhering platelets (pieces/$4.3 \times 10^3 \mu m^2$) |  | 1.6 | 0.7 | 71.1 | 59.2 |

Examples 9 and 10

Gut-form samples were obtained in the same manner of Examples 7 and 8, except that polyethylene glycol was changed to polyethylene glycol dimethyl ether (Code: 445908-250G, hereinafter PEGdm, manufactured by Sigma Aldrich Japan Co., Ltd.). The samples were analyzed by infrared absorption spectrometry (FTIR-8100A, manufactured by Shimadzu Corporation) and consequently, signals derived from PET and signals derived from PEGdm were observed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weights of PET were as shown in Table 5. Further, it was confirmed by transmission electron microscopic observation that a bicontinuous structure of two phases was formed. From the above-mentioned results, it was understood that the transparent yellow gut-form samples were PET/PEGdm alloys.

The above-mentioned gut-form samples were thermally pressed at 260° C. and 1.5 MPa to produce sheets (thickness 0.1 mm) of which small angle x-ray scattering spectra were measured, and static contact angle measurement with water and a blood compatibility test were carried out. The results are shown in Table 5. Spinodal decomposition was induced by increasing a molecular weight by BHT polycondensation to carry out polymer alloying and consequently the numeral value of (a)/(b) calculated from the peak half width (a) and the peak maximum wavelength (b) was 1.2 or lower, and the polymer alloys with high evenness of the structure were obtained. These polymer alloys were found having excellent hydrophilicity and blood compatibility as compared with those of Comparative Example 8. The PET/PEGdm alloys can be used preferably for providing hygroscopicity to polyester fibers and also as biomaterials.

Comparative Examples 11 and 12

As Comparative Examples, alloying of PET and PEG by melt-kneading was carried out. PET and PEG in compositions shown in Table 5 were supplied to a biaxial screw extruder (PCM-30, manufactured by Ikegai Ltd.) set at an extrusion temperature of 300° C. and guts discharged out of dies were immediately quenched in water to fix the structures and obtain gut-form samples. Each specimen was obtained by cutting off the gut-form samples and sandwiched with cover glass and heated to 270° C. and immediately quenched in an ice water bath. The samples were observed by an optical microscope to find that the samples had an island structure containing island components with various particle sizes of 1 to 100 μm. Successively, light scattering spectra were measured for the above-mentioned optical microscopic samples by a light scattering apparatus and found that no peak was observed. Also, the above-mentioned gut samples were thermally pressed at 260° C. and 1.5 MPa to produce sheets (thickness 0.1 mm) which were subjected to static contact angle measurement with water and a blood compatibility test. The results are shown in Table 5. It can be understood that both hydrophilicity and blood compatibility were inferior as compared with those of Examples 9 and 10.

Comparative Example 13

As Comparative Example, experiments were carried out for PET alone. The results are shown in Table 5. Since it was not an alloy, no peak was observed in both light scattering spectrum and small angle x-ray scattering spectrum. It can be understood that both hydrophilicity and blood compatibility were inferior as compared with those of Examples 7 to 10.

TABLE 5

|  |  | Example 9 | Example 10 | Comparative example 11 | Comparative example 12 | Comparative example 13 |
|---|---|---|---|---|---|---|
| Raw material composition (% by weight) | BHT | 98.45 | 96.15 | — | — | — |
|  | Antimony trioxide | 0.02 | 0.02 | — | — | — |
|  | PEGdm | 1.52 | 3.83 | 5 | 10 | 0 |
|  | PET | — | — | 95 | 90 | 100 |
| Number average molecular weight |  | 10900 | 10200 | — | — | — |
| Weight average molecular weight |  | 20100 | 19900 | — | — | — |
| Peak half-width (a) ($nm^{-1}$) |  | 0.10 | 0.11 | No peak | No peak | No peak |
| Peak maximum wavelength (b) ($nm^{-1}$) |  | 0.11 | 0.10 |  |  |  |
| (a)/(b) |  | 0.91 | 1.10 |  |  |  |
| Structure cycle (nm) |  | 9.1 | 10.0 | — | — | — |

TABLE 5-continued

|  | Example 9 | Example 10 | Comparative example 11 | Comparative example 12 | Comparative example 13 |
|---|---|---|---|---|---|
| Contact angle with water (Mpa) | 51.7 | 53.3 | 81.1 | 79.4 | 81.7 |
| Number of adhering platelets (Gpa) | 3.5 | 4.2 | 66.6 | 68.1 | >100 |

Examples 11 and 12

Using bis(2-hydroxyethyl)terephthalate (Code: 465151-500G, Sigma Aldrich Japan Co., Ltd., hereinafter abbreviated as BHT), a precursor of PET, as a precursor (A); an amorphous polyether imide (Extem XH1015, manufactured by SABIC Innovative Plastics, hereinafter as TPI(2))PEI, as a thermoplastic resin component (B1); and antimony trioxide (Code: 018-04402, manufactured by Wako Pure Chemical Industries, Ltd.) as a polymerization catalyst, these compounds were mixed at ratios shown in Table 5 and fed to 500 ml-glass test tubes of reaction containers. After the reaction containers were replaced with nitrogen, polymerization was started by heating and stirring. In 30 minutes from starting heating, it reached 325° C. and immediately after that, heating was stopped and pressure reduction was started. Produced ethylene glycol was removed out of the reaction system and polymerization was further promoted. After 15 minutes, it reached 290° C. and the inner pressure of the reaction containers reached 0.2 kPa. Thereafter, heating and stirring were carried out at 290° C. and 0.2 kPa for 90 minutes. On completion of heating, the reaction products were quickly discharged to water and quenched to fix the structures and obtain transparent yellow gut-form samples.

The samples were analyzed by infrared absorption spectrometry (FTIR-8100A, manufactured by Shimadzu Corporation) and consequently, signals derived from PET and signals derived from TPI(2) were observed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weights of PET were as shown in Table 6. Further, it was confirmed by transmission electron microscopic observation that a bicontinuous structure of two phases was formed. From the above-mentioned results, it was understood that the transparent yellow gut-form samples were PET/TPI (2) alloys. The above-mentioned gut-form samples were thermally pressed at 280° C. and 1.5 MPa to produce sheets (thickness 0.1 mm) of which light scattering spectra were measured. The peak half width (a), peak maximum wavelength (b), (a)/(b), and the value of the structure cycle in the spectra are shown in Table 6.

After being stretched at 100° C. by 3.5 times as long in the vertical direction, each sheet was stretched at 85° C. by 4.0 times as wide in the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. The results are shown in Table 6. Spinodal decomposition was induced by increasing a molecular weight by BHT polycondensation to carry out polymer alloying and consequently the numeral value of (a)/(b) calculated from the peak half width (a) and the peak maximum wavelength (b) was 1.2 or lower and the polymer alloys with high evenness of the structure were obtained. These polymer alloys were found having excellent mechanical characteristics as compared with those of Comparative Examples 1 to 3.

Comparative Example 14

As Comparative Example, alloying with a structure cycle of 1 μm or higher was carried out. In the heating and stirring at 290° C. and 0.2 kPa in Example 12, stirring was stopped after 90 minutes and heating was continued for 120 minutes. Thereafter, the reaction product was quickly discharged in water and quenched to fix the structure and obtain a gut-form sample. The sample was analyzed by infrared absorption spectrometry (FTIR-8100A, manufactured by Shimadzu Corporation) and consequently, a signal derived from PET and a signal derived from TPI (2) were observed. Further, the samples were dissolved in hexafluoroisopropanol and analyzed by gel permeation chromatography (Apparatus: Model 510, manufactured by Waters Corporation, Columns: GPC HFIP-806M, manufactured by Showa Denko K.K.) to find that the average molecular weight of PET was as shown in Table 6. Further, it was confirmed by transmission electron microscopic observation that a bicontinuous structure of two phases was formed. From the above-mentioned results, it was understood that the transparent yellow the gut-form samples was PET/TPI (2) alloy. The above-mentioned gut-form sample was thermally pressed at 280° C. and 1.5 MPa to produce a sheet (thickness 0.1 mm) of which a light scattering spectrum was measured. The peak half width (a), peak maximum wavelength (b), (a)/(b), and the value of the structure cycle in the spectra are shown in Table 6.

After being stretched at 100° C. by 3.5 times as long in the vertical direction, the sheet was stretched at 85° C. by 4.0 times as wide in the transverse direction and thermally fixed at 200° C. for 1 minute to produce a film which was cut off to obtain a sample with length×width=50 mm×10 mm and the tensile strength and modulus of elongation were measured at a pulling speed of 300 mm/min in atmosphere of 25° C. and 65% humidity. The results are shown in Table 6. As a result of the dispersion structure with the structure size of 1 μm or higher, it was found that both tensile strength and modulus of elongation were found being inferior as compared with those of Example 12.

Comparative Examples 15 and 16

As Comparative Examples, alloying by melt-kneading was carried out, using two kinds of thermoplastic resins. PET and TPI(2) in compositions shown in Table 6 were supplied to a biaxial screw extruder (PCM-30, manufactured by Ikegai Ltd.) set at an extrusion temperature of 350° C. and guts discharged out of dies were quenched in water to fix the structures and obtain gut-form samples. The above-mentioned gut-form samples were thermally pressed at 280° C. and 1.5 MPa to produce sheets (thickness 0.1 mm) of which small angle x-ray scattering spectra and light scattering spectra were measured. The peak half width (a), peak maximum wavelength (b), (a)/(b), and the value of the structure cycle in the spectra are shown in Table 6. The peak half width was large and (a)/(b) exceeded 1.2. Further, since the peak half width was large, no peak was observed in Comparative Examples 1 and 2. After being stretched at 100° C. by 3.5 times as long in the vertical direction, the sheets were stretched at 85° C. by 4.0 times as wide in the transverse direction and thermally fixed at 200° C. for 1 minute to produce films which were cut off to obtain samples with length×width=50 mm×10 mm and the tensile strength and modulus of elongation were measured at a pulling speed of 300 mm/min in atmosphere of 25° C. and 65% humidity. As a result, it was found that, as shown in Table 6, both tensile strength and modulus of elongation were found not so much different as compared with those of PET (Comparative Example 4).

After being stretched at 100° C. by 3.5 times as long in the vertical direction, each sheet was stretched at 85° C. by 4.0 times as wide in the transverse direction to produce a film which was cut off to obtain a sample with length×width=50 mm×10 mm and the tensile strength and modulus of elongation were measured at a pulling speed of 300 mm/min in atmosphere of 25° C. and 65% humidity. The results are shown in Table 7. Spinodal decomposition was induced by increasing a molecular weight by ring-opening polymerization of the cyclic PPS oligomer to carry out polymer alloying and consequently the numeral value of (a)/(b) calculated from the peak half width (a) and the peak maximum wavelength (b)

TABLE 6

|  |  | Example 11 | Example 12 | Comparative example 14 | Comparative example 15 | Comparative example 16 |
|---|---|---|---|---|---|---|
| Raw material | BHT | 98.45 | 96.15 | 96.15 | — | — |
| composition | Antimony trioxide | 0.02 | 0.02 | 0.02 | — | — |
| (% by weight) | TPI [2] | 1.52 | 3.83 | 3.83 | 5 | 10 |
|  | PET | — | — | — | 95 | 90 |
| Number average molecular weight |  | 11200 | 12000 | 11300 | — | — |
| Weight average molecular weight |  | 20300 | 21600 | 20300 | — | — |
| Peak half-width (a) (µm$^{-1}$) |  | 2.43 | 1.62 | 0.81 | No peak | No peak |
| Peak maximum wavelength (b) (µm$^{-1}$) |  | 2.24 | 1.48 | 0.72 |  |  |
| (a)/(b) |  | 1.08 | 1.09 | 1.13 |  |  |
| Structure cycle (µm) |  | 0.45 | 0.68 | 1.4 | — | — |
| Tensile strength (MPa) |  | 219 | 223 | 151 | 133 | 139 |
| Modulus of elongation (GPa) |  | 3.4 | 3.7 | 3.0 | 2.8 | 2.9 |

Examples 13 and 14

A chloroform solution of polyether imide ("Ultem 1010" manufactured by SABIC Innovative Plastics, hereinafter abbreviated as PEI) in 6.25% by mass was dropwise added to hexane and PEI was powdered by re-precipitation. The powdered PEI was vacuum dried at 50° C. for 24 hours and agglomerates were completely pulverized in a mortar. Using a cyclic PPS oligomer, a precursor of PPS, as a precursor (A); PEI prepared in the above-mentioned manner as a thermoplastic resin component (B1) were mixed at ratios shown in Table 7 and fed to 500 ml-glass test tubes of reaction containers. After the reaction containers were replaced with nitrogen, polymerization was started by heating and stirring. In 30 minutes from starting heating, it reached 340° C. and heating and stirring were carried out for 60 minutes. On completion of heating, the reaction products were quickly discharged to water and quenched to fix the structures and obtain transparent yellow gut-form samples. The samples were analyzed by infrared absorption spectrometry (FTIR-8100A, manufactured by Shimadzu Corporation) and consequently, signals derived from PPS and signals derived from PEI were observed. Further, it was confirmed that a bicontinuous structure of two phases was formed by transmission electron microscopic observation. From the above-mentioned results, it was understood that the transparent yellow gut-form samples were PPS/PEI alloys. The above-mentioned gut-form samples were thermally pressed at 320° C. and 1.5 MPa to produce sheets (thickness 0.1 mm) of which light scattering spectra were measured. The peak half width (a), peak maximum wavelength (b), (a)/(b), and the value of the structure cycle in the spectra are shown in Table 7. The peak half width was 1.2 or lower, and the polymer alloys with high evenness of the structure were obtained. These polymer alloys were found having excellent mechanical characteristics as compared with those of a polymer alloy of Comparative Example 7 produced by melt-kneading.

Comparative Examples 17 and 18

As Comparative Examples, alloying by melt-kneading was carried out, using two kinds of thermoplastic resins. PPS and PEI in compositions shown in Table 7 were supplied to a biaxial screw extruder (PCM-30, manufactured by Ikegai Ltd.) set at an extrusion temperature of 320° C. and guts discharged out of dies were quenched in water to fix the structures and obtain gut-form samples. The above-mentioned gut-form samples were thermally pressed at 320° C. and 1.5 MPa to produce sheets (thickness 0.1 mm) of which small angle x-ray scattering spectra and light scattering spectra were measured. The peak half width (a), peak maximum wavelength (b), (a)/(b), and the value of the structure cycle in the spectra are shown in Table 7. The peak half width was large and (a)/(b) exceeded 1.2. Further, since the peak half width was large, no peak was observed in Comparative Examples 1 and 2.

After being stretched at 100° C. by 3.5 times as long in the vertical direction, the sheets were stretched at 85° C. by 4.0 times as wide in the transverse direction and thermally fixed at 200° C. for 1 minute to produce films which were cut off to obtain samples with length×width=50 mm×10 mm and the tensile strength and modulus of elongation were measured at a pulling speed of 300 mm/min in atmosphere of 25° C. and 65% humidity. As a result, it was found that, as shown in Table 7, both tensile strength and modulus of elongation were found not so much different as compared with those of PET (Comparative Example 4).

TABLE 7

|  |  | Example 13 | Example 14 | Comparative example 17 | Comparative example 18 |
|---|---|---|---|---|---|
| Raw material composition (% by weight) | Cyclic PPS oligomer | 95 | 90 | — | — |
|  | PEI | 5 | 10 | 5 | 10 |
|  | PPS | — | — | 95 | 90 |
| Peak half-width (a) ($\mu m^{-1}$) |  | 1.43 | 1.31 | No peak | No peak |
| Peak maximum wavelength (b) ($\mu m^{-1}$) |  | 1.27 | 1.25 |  |  |
| (a)/(b) |  | 1.13 | 1.05 |  |  |
| Structure cycle ($\mu m$) |  | 0.79 | 0.80 | — | — |
| Tensile strength (MPa) |  | 135 | 141 | 95 | 98 |
| Modulus of elongation (GPa) |  | 3.6 | 3.8 | 2.6 | 2.8 |

INDUSTRIAL APPLICABILITY OF THE INVENTION

A polymer alloy and its production method of the present invention are capable of finely controlling the structure and evenly dispersing the structure. As a result, a polymer alloy having excellent physical properties can be obtained. The polymer alloy can be used preferably not only for a substitute for a metal alloy in automotive parts and electric and electronic parts aiming of lightweight and high functionality but also for medical materials by providing blood compatibility by alloying with hydrophilic polymers. Further, selective removal of a part of a polymer composing a polymer alloy by a solvent or the like makes the obtained polymer alloy preferably usable for porous fine particles for highly functional separation membranes and adsorption columns.

The invention claimed is:

1. A production method of a polymer alloy composed of at least two or more components of thermoplastic resins, which comprises:

inducing spinodal decomposition by causing a polymerization reaction after phase dissolution of a precursor (A) with a molecular weight of 1500 or less of at least one thermoplastic resin component among the thermoplastic resin components composing the polymer alloy with the remaining thermoplastic resin component (B1) and/or a precursor (B2) of the thermoplastic resin component, wherein the precursor (A) is a cyclic oligoester or a cyclic oligarylene sulfide.

2. The production method of a polymer alloy according to claim 1, wherein after phase dissolution of the precursor (A) with at least one of the remaining thermoplastic resin component (B1) and/or a precursor (B2) of the thermoplastic resin component and polymerization reaction, phase separation is carried out.

3. The production method of a polymer alloy according to claim 1, wherein the precursor (B2) of the thermoplastic resin component is a cyclic compound is 100 or higher and 10000 or lower, and said precursor (B2) is a cyclic compound.

4. The production method of a polymer alloy according to claim 1, wherein precursor (A) is a precursor of poly(phenylene sulfide).

5. The production method of a polymer alloy according to claim 1, wherein precursor (A) is a precursor of poly(ethylene terephthalate).

* * * * *